(No Model.)

L. ATWOOD.
GEAR WHEEL.

No. 441,460.

Patented Nov. 25, 1890.

Witnesses:
A. Schleicher.
B. V. Groupe.

Inventor:
Leonard Atwood
by his Attorneys
Howson & Howson

UNITED STATES PATENT OFFICE.

LEONARD ATWOOD, OF PHILADELPHIA, PENNSYLVANIA.

GEAR-WHEEL.

SPECIFICATION forming part of Letters Patent No. 441,460, dated November 25, 1890.

Application filed June 27, 1890. Serial No. 356,972. (No model.)

*To all whom it may concern:*

Be it known that I, LEONARD ATWOOD, a citizen of the United States, and a resident of Philadelphia, Pennsylvania, have invented certain Improvements in Gear-Wheels or Racks, of which the following is a specification.

The object of my invention is to obviate as much as possible the wear upon the teeth of gear-wheels and pinions caused by abrasion, and at the same time to make the teeth sufficiently tough and strong to withstand the jar and pressure, and also to make the teeth detachable, so that they can be readily replaced when completely worn away.

Figure 1:
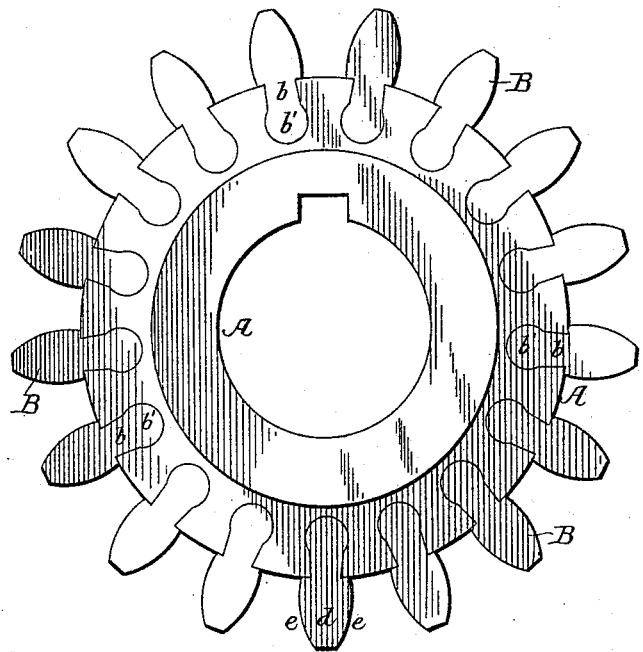
Figure 3:
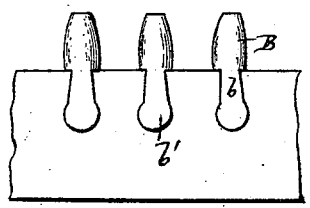
Figure 2:
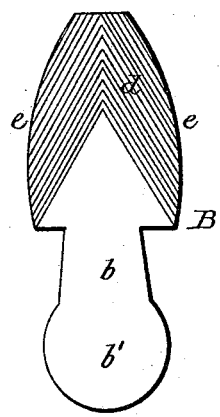

In the accompanying drawings, Figure 1 is a side view of a pinion illustrating my invention. Fig. 2 is an enlarged view of one of the teeth detached, and Fig. 3 is a view showing a rack embodying my invention.

It has been found by experiment and in practice that the teeth of a pinion or gear-wheel as usually made will wear away very rapidly, especially so under rough usage—as, for instance, in the gearing of an electric car, where the motor-shaft is geared to the axle of the car, owing to the constant stopping and starting of the mechanism and the accumulation of dirt under the car. An ordinary gear-wheel tempered or hardened to prevent the rapid wearing away of the teeth will not stand the sudden strains, and consequently the wheels have been made comparatively soft and tough.

By my invention I am enabled to make the wearing-surfaces of the teeth very hard, but the shanks of the teeth and the body of the wheel very tough.

Referring to the drawings, A is the body of a pinion having a series of cavities or sockets, in which are forced the shanks $b$ of the teeth B, the rounded portions $b'$ of each tooth fitting snugly the rounded opening in the body of the wheel. In some instances the teeth and body of the wheel may be made in a single piece. The exposed portion $d$ of the tooth has the bearing-faces $e\ e$ and is hardened, as shown in Fig. 2, so that the working-surface of the teeth will withstand the abrasion of the teeth of a wheel or rack with which it meshes; but the balance of each tooth, as well as the body of the wheel, is not hardened to the degree that the working-surface is, and consequently is tough and will withstand the jar and strains to which the wheel is subjected.

When a tooth does wear out at last, it can be readily removed from its socket and a new tooth inserted without much loss of time and material.

The shank of the tooth and the socket in the body A can be formed differently, as circumstances suggest.

A rack may be made on the same principle as above described, as shown in Fig. 3, without departing from my invention.

I claim as my invention—

1. A gear-wheel or rack having a body and the base of the teeth of toughened metal and the wearing-surfaces of the teeth hardened, substantially as and for the purpose set forth.

2. The combination, in a gear-wheel or rack, of the body portion A, having sockets, teeth B, adapted to said sockets, the metal shanks of the teeth being toughened, and the wearing portion of the teeth being hardened, substantially as described.

In testimony whereof I have signed my name to this specification in the presence of two subscribing witnesses.

LEONARD ATWOOD.

Witnesses:
HENRY HOWSON,
HARRY SMITH.